United States Patent

[11] 3,564,272

[72] Inventors Edmund James Payton
Tadworth;
Colin Wilson, New Malden, England
[21] Appl. No. 743,522
[22] Filed July 9, 1968
[45] Patented Feb. 16, 1971
[73] Assignee Central Electricity Generating Board
London, England
[32] Priority July 11, 1967
[33] Great Britain
[31] 31,798/67

[54] OPTICAL DEVICE FOR EXAMINATION OF SMOKE OR DUST LADEN GAS
13 Claims, 2 Drawing Figs.
[52] U.S. Cl. ................................................. 250/218,
356/207
[51] Int. Cl. ....................................................... G01n 21/12
[50] Field of Search ........................................... 250/218;
356/207, 208

[56] References Cited
UNITED STATES PATENTS
2,691,737  10/1954  Holby ........................... 356/207
3,361,030  2/1968   Goldberg ....................... 250/218

*Primary Examiner*—William F. Lindquist
*Assistant Examiner*—Martin Abramson
*Attorney*—Watson, Cole, Grindle & Watson ABSTRACT: An optical device for examination of smoke- or dust-laden gases such as flue gas from a furnace. The device comprises a tube with a lamp at one end and a photocell at the other end and diametrically opposite slots in the tube to allow the gas to be examined to pass between the lamp and the photocell. Means are provided to ensure that there is a flow of air away from each end of the tube towards the slots to prevent dust from the gas reaching the lamp and photocell.

PATENTED FEB 16 1971

3,564,272

INVENTORS
EDMUND J. PAYTON
COLIN WILSON
BY
Watson, Cole, Grindle & Watson
ATTORNEY

OPTICAL DEVICE FOR EXAMINATION OF SMOKE OR DUST LADEN GAS

This invention relates to optical devices for examination of smoke- or dust-laden gases such as flue gas from a furnace.

One of the problems encountered in devices for the examination of smoke- or dust-laden gas is that the light source and the photosensitive device or transparent barriers ahead of the light source and the photosensitive device tend to become obscured by hazing or the deposition of dust from the gas being examined, and it is an object of the invention to overcome this problem. The invention provides an optical device for examination of smoke- or dust-laden gas which includes a tube having a first end portion, a second end portion and a central portion between said end portions. One end portion contains a light source, the other end portion contains a photosensitive device to receive light from the light source and the central portion has diametrically opposed apertures to permit the passage of the gas to be examined across the axis of the tube. An air duct extends along and within the tube from the first end portion to the second end portion, and air inlet means are provided for the admission of air to the air duct and to the first end portion.

With an optical device constructed in accordance with the invention, an air flow can be provided away from the light source and away from the photosensitive device towards the gas being examined so that the gas does not have an opportunity of contaminating these components. Thus, for example, if the device is used in a flue which is operating at negative pressure the air inlet means may be opened to atmosphere and a flow of air will be induced from the atmosphere through the two end portions into the central portion and then into the flue. If the device is being used in a duct which is operating at a pressure which is normally positive or is liable to rise to positive, an air pump may be provided for delivering slightly compressed air into the air inlet means. The device itself may mount the air pump.

In a preferred construction, the first end portion of the tube includes a chamber to which there is an inlet for the admission of air and from which there is an outlet to the remainder of the first end portion. The duct leading to the second end portion opens into the chamber. As an additional precaution to resist the entry of gas into the first and second end portions of the tube, each of these portions may have a baffle extending across the portion adjacent the central portion and having a central aperture for the passage of light from the light source to the photosensitive device. There may be a number of such baffles to form a dust trap. The baffles may be formed as a continuous strip arranged as a helix with the outer edge of the strip in contact with the inner surface of the tube and the inner edge bounding the light path between the light source and the photosensitive device.

Between the light source and the central portion there may be a barrier in the form of a hinged flap arranged to fall open when the optical device is orientated for use but to fall closed in at least one other orientation to prevent the ingress of gas from the flue during insertion and withdrawal of the optical device into and out of the flue and at other times when the device is not in use. There may be a similar barrier between the photosensitive device and the barrier.

The diametrically opposed apertures in the central portion of the tube may take various forms but preferably they are in the form of longitudinally extending slots.

The invention may be carried into practice in various ways but one optical device embodying the invention will now be described by way of example with reference to the accompanying drawings, in which.

Figure 1:
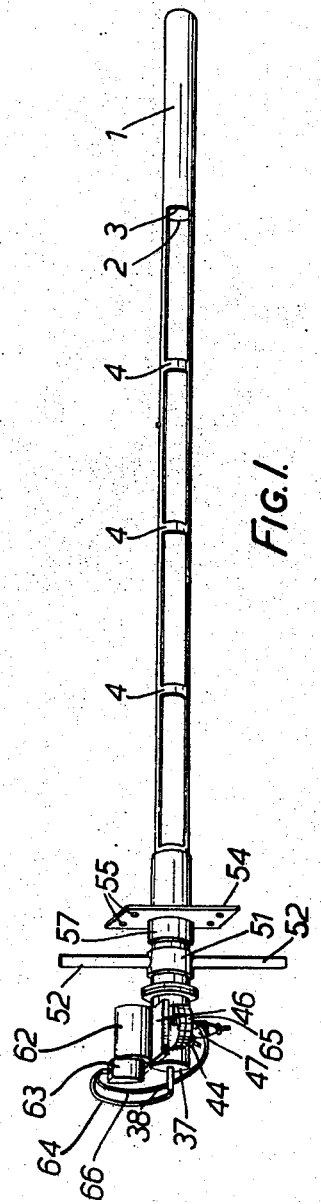
FIG. 1 is a general perspective view of the device.

The device shown in the drawings is intended to be introduced into a flue gas duct of a fuel burning appliance. For example the instrument may be used as a dust monitor for pulverized fuel boilers or as a smoke motor for this or other forms of fuel burning appliance.

The device comprises a stainless steel tube 1 which is approximately 7 feet, 6 inches long. Over approximately the central 4 feet, 6 inches of this length the opposite walls of the tube are slotted out, one of the slots 2 being slightly shorter at each end than the other slot 3. The stiffness of the tube 1 is preserved by leaving straps 4 at approximately 1 foot intervals across each of the slots 2 and 3. The tube thus has two end portions separated by a central portion in which the slots are formed.

Figure 2:
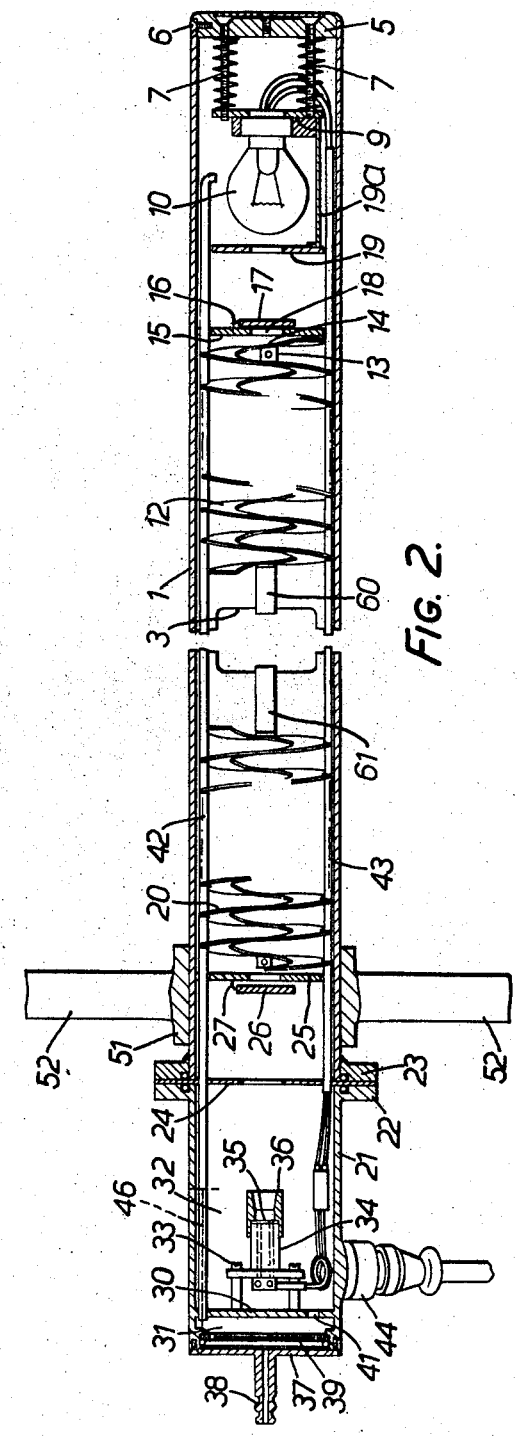
FIG. 2 is a fragmentary longitudinal section of the device drawn to a larger scale.

FIG. 2 is a longitudinal section through the device with the omission of the central portion having the slots so that only the two end portions are shown. One end of the tube 1 is closed by a disc 5 retained by screws 6 and supporting screw 7 on which a mounting 9 for an electric lamp bulb 10 is carried. Compression springs 8 surround the screws 7. Between the bulb 10 and the rear end of the slot 3 there is a apertured screen 19 supported by a bracket 19a a disc 15 and a dust trap formed by a number of baffles formed by a strip 12 which is formed into a helix with the outer edges in contact with the inner surface of the tube 1 and with the inner edges bounding an axially extending passage through which light rays from the bulb 10 can pass along the axis of the tube. The strip is retained in position by a screw 13 which passes through a bracket 14 secured to the strip and into the wall of the tube 1. At the outer end of the strip there is a tab 60 which extends as far as the slot 3. The inner edge of the strip bounding the central passage is chamfered to a sharp edge. The disc 15 has a central aperture 18 which can be closed by a flap 17 which is hinged to the disc 15 by a polytetrafluoroethylene strip 16. The flap is normally open but, as will be explained below, is closed during insertion of the device into a gas stream and then lies flat against the disc although, for clarity, it is illustrated as being slightly spaced from the disc. The left hand end portion of the tube 1 as seen in FIG. 2 contains a second helical strip 20 forming a second dust trap similar to that already described and having a tab 61 similar to the tab 60. Adjacent the inner end of the strip 20 there is an apertured disc 25 similar to the disc 15 and having a flap 26 which is hinged to the disc 25 by a polytetrafluoroethylene strip 27. The operation of this flap is the same as that of the flap 17 at the other end of the device.

At the left-hand end, the tube 1 is extended by a photocell housing 21 which is connected to the tube by bolts (not shown) passing through flanges 22 and 23 on the photocell housing and the tube, respectively. Clamped between these flanges is an apertured diaphragm wall 24. A septum wall 30 divides the photocell housing 21 into a first chamber 31 and a second chamber 32. Supported by screws 33 from the septum wall 30 is a photocell mounting 34 which carries a photocell 35 and a photocell shield 36 which is tubular in form and is a push fit over the holder 34. The chamber 31 is closed by a disc 37 having a nipple 38 for the connection of a flexible tube for the supply of compressed air to the chamber 31. A circular filter pad 39 is located in the chamber 31 between the air inlet and the chamber itself. There is a hole 41 in the septum wall 30 interconnecting the chambers 31 and 32. There is also a pipe 42 which extends from the chamber 31 through the septum wall 30, the diaphragm wall 24 and the dust traps 12 and 20 and terminates adjacent the lamp 10. A second pipe 43 extends from the diaphragm wall 24 to the vicinity of the bulb 10 and this carries electrical leads to the bulb. These leads pass out of a weatherproof plug and socket connector 44 mounted on the side of the photocell housing 21 together with leads to the photocell 35. On the top of the photocell housing 21 there is a boss 46 forming a platform to the upper side of which an electric motor 62 is attached. The electric motor carries and drives an air pump 63 the pressure discharge of which is connected by a flexible pipe 64 to the nipple 38. An air filter 65 is secured to the underside of the boss 46 and is connected to the suction inlet of the pump 63 by a flexible pipe 66. The housing also carries a second socket 47 through which electrical leads (not shown) pass to the motor 62.

Surrounding the left-hand end of the tube 1 adjacent the flange 23 is a split collar 51 each half of which has a projecting rod 52, the two rods forming handles by which the device may be manipulated. Adjacent the handles the tube is surrounded by a sleeve 57 which is welded to a rectangular plate 54 having holes 55 at the corners.

The instrument is used as follows. The wall of the duct carrying the gas to be examined has a hole to receive the instrument. Around this hole there are four studs with the same spacing as the apertures 55 in the plate 54. Normally the hole in the duct wall is closed by a plain plate similar to the plate 54 but without the central aperture and the sleeve 57. When the instrument is to be used the plain plate is removed and replaced by the plate 54 carrying the sleeve 57. The tube 1 is slid through the sleeve into the gas duct to the position shown in FIG. 1. It will be assumed that the direction of flow of gas in the duct is upwards. During insertion the device is orientated so that the slots lie on each side of the device with the result that the flaps 17, 26 hang down and close off the end portions of the tube in which the photocell 35 and the light bulb 10 are located. This prevents the admission of dust to the vicinities of the photocell and the bulb before the device is to be used. When the device is fully inserted, it is rotated through 90° to bring the longer slot 3 to the bottom and the shorter slot 2 to the top. This rotation will also cause the flaps 17 and 26 to fall open. If the pressure in the duct is known to be always below atmospheric pressure the nipple 38 will be left unconnected and as soon as the flaps open air will be drawn in through the nipple to the chamber 31. Part will pass through the hole 41 in the septum wall 30 into the chamber 32 containing the photocell and will pass through the aperture uncovered by the flap 26 and the dust trap 20 and will pass into the gas stream flowing through the slots 2, 3. The remainder will pass from the chamber 31 through the pipe 42 to the end portion housing the lamp bulb 10 and will then pass through the aperture 18 uncovered by the flap 17 and the dust trap 12 into the gas flow between the slots 2, 3. If the pressure in the duct is at or above atmospheric pressure or is liable at times to rise to or above atmospheric pressure, the nipple 38 is connected by the pipe 64 to the air pump 63 and the motor 62 is driven. Accordingly air will be blown into the chamber 31 and will pass through the opening 41 and the tube 42 eventually reaching the gas flow as described above. Thus it will be seen that there is always a flow away from the photocell and the light bulb towards the gas flow so that these components are kept free from dust.

When a reading is required, the lamp 10 is switched on and the intensity of illumination falling on the photocell device 25 is measured by an appropriate meter; the magnitude of this measurement will depend on the opaqueness of the gas passing through the slots in the tube. The fact that the lowermost slot 2 is somewhat shorter than the upper slot 3 will produce a slight ejector effect across the mouths of the two dust traps, this effect supplementing the flow of air out of these traps into the gas stream. Any gas that does enter the dust traps will be eddying and will very quickly be slowed down by the baffles so that particles suspended in the gas will be deposited between the baffles. Deposited particles can be emptied from time to time by releasing the screws retaining the strips 12 and 20 and by means of the tabs 60 and 61 sliding the strips lengthwise of the tube until they overlap the slots 2 and 3 whereupon the particles will fall out.

A datum reading with which the readings of opaqueness can be compared can be obtained by withdrawing the instrument from the duct and taking the reading in clear air.

Although the device described above incorporates dust traps comprising several baffles formed by the helical strips, under some conditions it may be possible to dispense with them since the air flow away from the photocell and the lamp may be sufficient to prevent dust reaching them. However, even when they are not necessary most of the time, the dust traps may serve their purpose during insertion and withdrawal of the device. In some circumstances, it may be found that each of the dust traps can be replaced by a single annular disc.

We claim:

1. An optical device for monitoring smoke- or dust-laden gas within a flue, comprising a tube having a first end portion, a second end portion and a central portion between said end portions, one end portion and said central portion are positioned in said flue, a light source is mounted in one end portion, a photosensitive device is mounted in the other end portion to receive light from said light source, said central portion having diametrically opposed apertures to permit the gas within the flue to flow across the longitudinal axis of said tube, an air duct extending along and within said tube from said first end portion to said second end portion, and air inlet means for the admission of air to said air duct and to said first end portion.

2. A device according to claim 1 wherein said first end portion includes a chamber to which said air inlet means and said duct open, and passage means leading from said chamber to the remainder of said first end portion.

3. A device according to claim 2 further comprising an air pump mounted on said tube at said first end portion and connected to said air inlet means.

4. A device according to claim 1 further comprising a baffle extending from said first end portion into said central portion, said baffle having a central aperture for the passage of light from said light source to said photosensitive device.

5. An optical device according to claim 1 further comprising a second baffle extending from said second end portion into said central portion, said second baffle having a central aperture for the passage of light from said light source to said photosensitive device.

6. An optical device according to claim 1 further comprising a first baffle extending from said first end portion into said central portion and a second baffle extending from said second end portion into said central portion, said first and second baffles having central apertures for the passage of light from said light source to said photosensitive device.

7. A device according to claim 1 further comprising a first disclike element having a first hinged flap and mounted between said photosensitive device and said central portion and a second disclike element having a hinged flap and mounted between said light source and said central portion.

8. A device according to claim 1 in which said diametrically opposed apertures in the tube are in the form of longitudinally extending slots.

9. An optical device for monitoring smoke- or dust-laden gas within a flue, comprising: a tube having a first end portion, a second end portion and a central portion between said end portions, a light source mounted in one end portion, a photosensitive device is mounted in the other end portion to receive light from said light source, said central portion and one end portion are positioned in said flue essentially perpendicular to the gas flow, said central portion having diametrically opposed slots to permit the gas within the flue to flow across the longitudinal axis of said tube between said light source and said photosensitive device, an air duct extending along and within said tube from said first end portion to said second end portion, an air pump mounted on said tube at said first end portion, and a pressurized air discharge line connecting said pump to said air duct and to said first end portion.

10. A device according to claim 9 further comprising a plurality of baffles extending from said first end portion into said central portion, and a plurality of baffles extending from said second end portion into said central portion, each of said baffles having a central aperture for the passage of light from said light source to said photosensitive device.

11. A device according to claim 10 in which said baffles each comprise a helical element.

12. A device according to claim 10 in which one baffle in both of said plurality of baffles carries a hinged flap to close said central aperture in the baffle.

13. A device according to claim 1 further comprising means for rotatably mounting said tube to said flue, and first and second sealing elements each having a central aperture and a hinged closing member, said first sealing element is mounted in said tube between said light source and said central portion and said second sealing element is mounted between said photosensitive device and said central portion, said closing members seal said sealing elements with said tube rotated to a first position in which said opposed apertures are substantially perpendicular to the gas flow and said closing members fall away from and unseal said sealing members with said tube rotated to a second position in which said opposed apertures are substantially parallel to the gas flow.